(12) United States Patent
Howard

(10) Patent No.: US 6,405,911 B1
(45) Date of Patent: Jun. 18, 2002

(54) COMMUNICATION ACCESSORY DEVICE

(76) Inventor: Gerald D. Howard, 7342 S. Phillips, Chicago, IL (US) 60649

( * ) Notice: Subject to any disclaimer, the term of this patent is extended or adjusted under 35 U.S.C. 154(b) by 0 days.

(21) Appl. No.: 09/810,068

(22) Filed: Mar. 16, 2001

(51) Int. Cl.$^7$ .................................................. A45F 5/00
(52) U.S. Cl. ........................ 224/677; 224/680; 224/684
(58) Field of Search ................. 224/677, 678, 224/684, 680, 666, 674, 195; D3/218

(56) References Cited

U.S. PATENT DOCUMENTS

| | | | | |
|---|---|---|---|---|
| 4,303,187 A | * | 12/1981 | Berman | 224/222 |
| 4,303,239 A | * | 12/1981 | Walsh, Jr. | 272/119 |
| D271,253 S | * | 11/1983 | Abatie | D2/400 |
| 4,485,946 A | | 12/1984 | Liautaud et al. | |
| 4,923,105 A | * | 5/1990 | Snyder | 224/255 |
| 4,953,767 A | * | 9/1990 | Bennett | 224/192 |
| 5,386,932 A | * | 2/1995 | Gross | 224/200 |
| 5,445,303 A | * | 8/1995 | Cawile, Jr. | 224/222 |
| D374,768 S | | 10/1996 | Lundie | |
| 5,568,889 A | * | 10/1996 | Holloway, Jr. et al. | 224/661 |
| 5,622,296 A | | 4/1997 | Pirhonen | |
| 5,695,104 A | * | 12/1997 | Darling | 224/684 |
| 5,833,100 A | | 11/1998 | Kim | |
| 5,850,954 A | | 12/1998 | Dong-Joo | |
| D414,925 S | | 10/1999 | Holland | |
| 6,065,659 A | * | 5/2000 | Faz | 224/661 |
| 6,119,909 A | * | 9/2000 | Dancyger | 224/683 |

* cited by examiner

Primary Examiner—Stephen P. Garbe

(57) ABSTRACT

A communication accessory device for simultaneously carrying a pair of communication devices. The communication accessory device includes a panel that has a belt loop formed thereon for removably receiving a belt of a user. A first strap is provided for forming a first loop for removably attaching a communication device to the panel. The first loop is attached to the panel.

9 Claims, 2 Drawing Sheets

COMMUNICATION ACCESSORY DEVICE

BACKGROUND OF THE INVENTION

1. Field of the Invention

The present invention relates to holders and more particularly pertains to a new c communication accessory device for simultaneously carrying a pair of communication devices.

2. Description of the Prior Art

The use of holders is known in the prior art. More specifically, holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. Des. 414,925; U.S. Pat. No. Des. 374,768; U.S. Pat. No. 5,850,954; U.S. Pat. No. 4,485,946; U.S. Pat. No. 5,833,100; and U.S. Pat. No. 5,622,296.

While these devices fulfill their respective, particular objectives and requirements, the aforementioned patents do not disclose a new communication accessory device. The inventive device includes a panel that has a loop formed thereon for removably receiving a belt of a user. A first strap is provided for forming a first loop for removably attaching a communication device to the panel. The first loop is attached to the panel.

In these respects, the communication accessory device according to the present invention substantially departs from the conventional concepts and designs of the prior art, and in so doing provides an apparatus primarily developed for the purpose of simultaneously carrying a pair of communication devices.

SUMMARY OF THE INVENTION

In view of the foregoing disadvantages inherent in the known types of holders now present in the prior art, the present invention provides a new communication accessory device construction wherein the same can be utilized for simultaneously carrying a pair of communication devices.

The general purpose of the present invention, which will be described subsequently in greater detail, is to provide a new communication accessory device apparatus and method which has many of the advantages of the holders mentioned heretofore and many novel features that result in a new communication accessory device which is not anticipated, rendered obvious, suggested, or even implied by any of the prior art holders, either alone or in any combination thereof.

To attain this, the present invention generally comprises a panel that has a loop formed thereon for removably receiving a belt of a user. A first strap is provided for forming a first loop for removably attaching a communication device to the panel. The first loop is attached to the panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new communication accessory device apparatus and method which has many of the advantages of the holders mentioned heretofore and many novel features that result in a new communication accessory device which is not anticipated, rendered obvious, suggested, or even implied by any of the prior art holders, either alone or in any combination thereof.

It is another object of the present invention to provide a new communication accessory device which may be easily and efficiently manufactured and marketed.

It is a further object of the present invention to provide a new communication accessory device which is of a durable and reliable construction.

An even further object of the present invention is to provide a new communication accessory device which is susceptible of a low cost of manufacture with regard to both materials and labor, and which accordingly is then susceptible of low prices of sale to the consuming public, thereby making such communication accessory device economically available to the buying public.

Still yet another object of the present invention is to provide a new communication accessory device which provides in the apparatuses and methods of the prior art some of the advantages thereof, while simultaneously overcoming some of the disadvantages normally associated therewith.

Still another object of the present invention is to provide a new communication accessory device for simultaneously carrying a pair of communication devices.

Yet another object of the present invention is to provide a new communication accessory device which includes a panel that has a loop formed thereon for removably receiving a belt of a user. A first strap is provided for forming a first loop for removably attaching a communication device to the panel. The first loop is attached to the panel.

Still yet another object of the present invention is to provide a new communication accessory device that allows a user to more efficiently carry more than one communication device at a time. Prior to the present invention, a user would have to attach both communication devices to their clothes making movement of the user difficult. The present invention allows a user to move more freely by lowering one of the communication devices below the user's waist.

Even still another object of the present invention is to provide a new communication accessory device that reduces the likelihood of a user losing their communication devices. Prior to the present invention, communication devices were easily lost when they came unclipped from the waist of the user, such as during various movements of the user including sitting down and standing up. The present invention secures the communication devices to the user's belt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
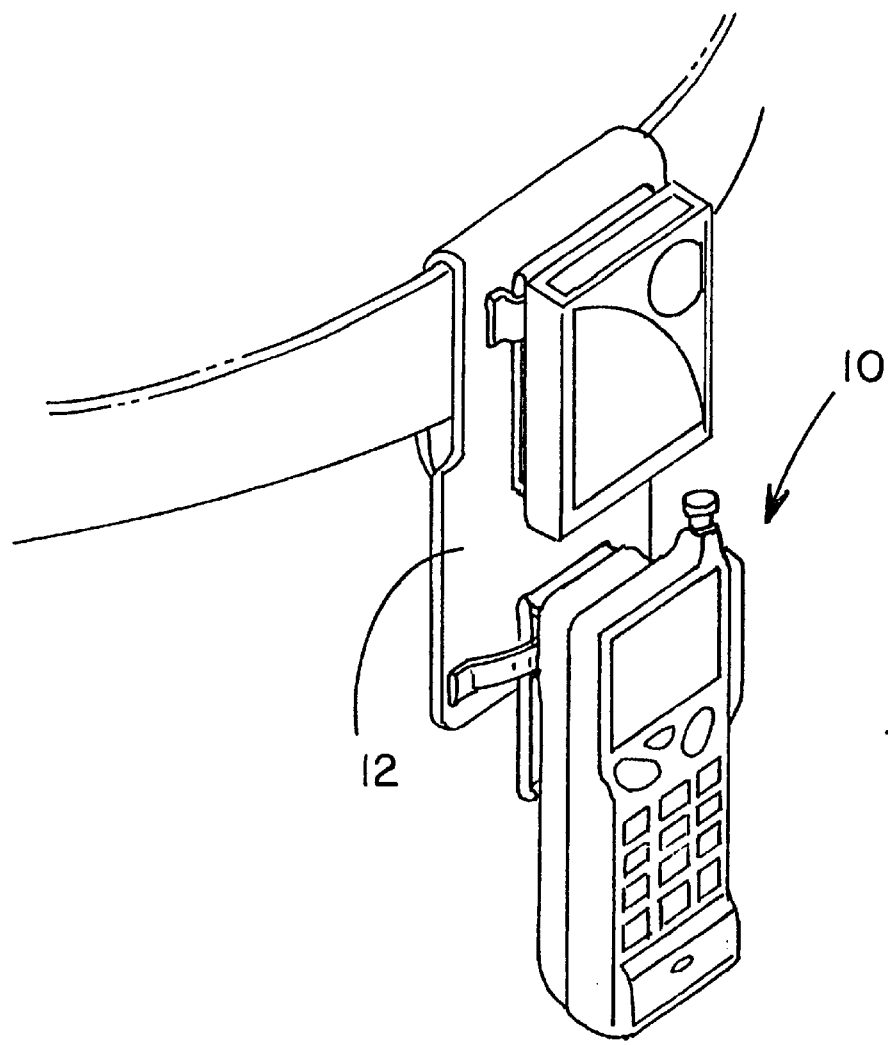
FIG. 1 is a schematic perspective view of a new communication accessory device according to the present invention.
Figure 2:
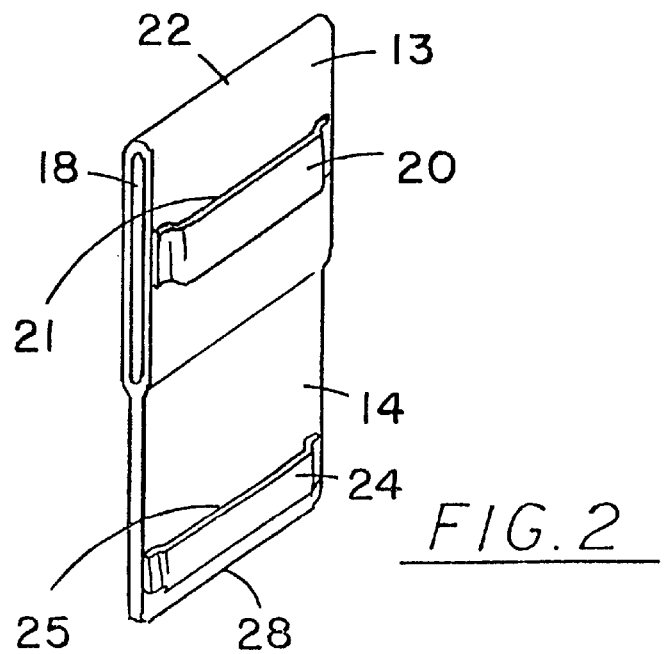
FIG. 2 is a schematic perspective view of the present invention.
Figure 3:
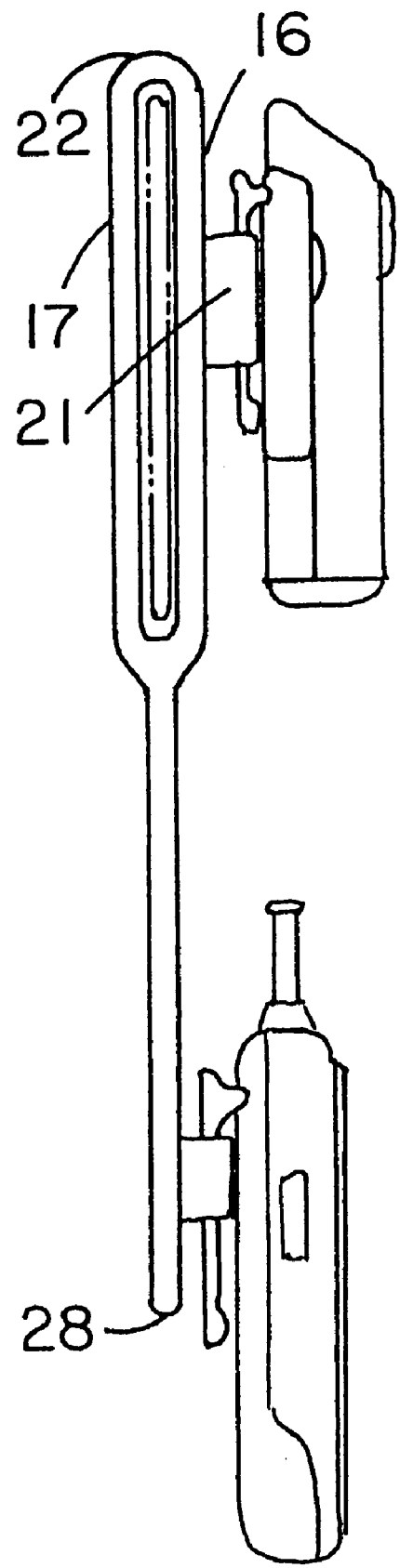
FIG. 3 is a schematic side view of the present invention.

With reference now to the drawings, and in particular to FIGS. 1 through 3 thereof, a new communication accessory device embodying the principles and concepts of the present invention and generally designated by the reference numeral 10 will be described.

As best illustrated in FIGS. 1 through 3, the communication accessory device 10 generally comprises a panel 12 for simultaneously carrying a pair of communication devices having a belt-mountable clip.

The panel 12 may include an upper panel portion 13 and a lower panel portion 14 with the lower panel portion being inset from a plane defined by the upper panel portion. Each of the panel portions 13 and 14 preferably include first surface 16 and a second surface 17. The upper panel portion 13 includes a belt loop 18 formed between the first surface 16 and second surface 17. The belt of the user is removably insertable through the belt loop 18. The panel 12 may comprise a generally flexible material such as, for example, a plastic or leather material. The panel 12 may have length measuring approximately four inches and a width measuring approximately two and one-quarter inches. The loop may have a height measuring approximately one and three-quarter inches.

As particularly illustrated in FIG. 2, a first strap 20 is provided for forming a first loop 21 for removably attaching a first communication device to the panel 12. The first loop 21 is attached to the first surface 16 of the upper raised panel portion 13. The first loop 21 may be positioned generally adjacent to a first end 22 of the panel 12. The belt-mountable clip of the communication device is removably insertable through the first loop 21.

A second strap 24 may be provided for forming a second loop 25 for removably attaching the second communication device to the panel 12. The second loop 25 is preferably attached to the first surface 16 of the second panel portion 14. The second loop 25 may be positioned generally adjacent to a second end 28 of the panel 12. The belt-mountable clip of the second communication device is removably insertable through the second loop 25 such that the second communication device may extend beyond the second end 28 of the panel 12. Each of the loops 21 and 25 may a length measuring approximately one and one-quarter inches.

In use, the belt-mountable clips of a pair of communication devices may be removably inserted through each of the loops 21 and 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A communication accessory device for carrying communication devices having a belt-mountable clip, said accessory device being removably attachable to a belt of a user, said accessory device comprising:

a panel for removably receiving a belt of a user, said panel comprising an upper panel portion and a lower panel portion, each of said panel portions having a first surface and a second surface, a plane of each of said surfaces of said lower panel portion being inset from a respective plane of each of said surfaces of said upper panel portion;

a first strap forming a first loop for removably attaching a first communication device to said panel, said first loop being attached to said panel and being positioned generally adjacent to a first end of said panel, wherein the clip of the first communication device is removably insertable through said first loop; and a second strap forming a second loop for removably attaching a second communication device to said panel, said second loop being attached to said panel and being positioned generally adjacent to a second end of said panel, wherein the clip of the second communication device is removably insertable through said second loop.

2. The communication accessory device of claim 1, wherein said upper panel portion has a belt loop formed between said first and second surfaces such that a belt of a user is removably insertable through said belt loop.

3. The communication accessory device of claim 1, wherein said first and second loops are attached to said first surface of said upper and lower panel portions respectively for removably receiving the clip of the communication devices.

4. The communication accessory device of claim 1, wherein said panel comprises a generally flexible material.

5. The communication accessory device of claim 1, in combination with first and second communication devices having a width and a length, further comprising said panel having a width generally equal to the width of the communication devices, said panel having a length generally equal to a cumulative length of each of the communication devices, wherein the communication devices are positionable on said panel in such a manner so as not to impede movements of the user while allowing access to the communication devices.

6. A communication accessory device for simultaneously carrying communication devices having a belt-mountable clip, said accessory device comprising:

a panel having an upper panel portion and a lower panel portion, each of said panel portions having a first surface and a second surface, said upper panel portion having a belt loop formed between said first and second surfaces, wherein a belt of a user is removably insertable through said belt loop, said panel comprising a generally flexible material;

a first strap forming a first loop for removably attaching a first communication device to said panel, said first loop being attached to said first surface of said upper panel portion, said first loop being positioned generally adjacent to a first end of said panel, the belt-mountable clip of the communication device being removably insertable through said first loop; and a second strap forming a second loop for removably attaching a second communication device to said panel, said second loop being attached to said first surface of said second panel portion and being positioned generally adjacent to a second end of said panel, wherein the clip of the second communication device being removably insertable through said second loop.

7. A communication accessory device for carrying communication devices having a belt-mountable clip, said accessory device comprising:

an elongate panel having a longitudinal axis, said elongate panel having a belt loop for removably receiving a belt of a user in a manner such that a length of the belt is oriented substantially perpendicular to the longitudinal axis of said elongate panel, said elongate panel comprising an upper panel portion and a lower panel portion, said upper panel portion forming said belt loop such that when a belt is inserted in said belt loop, said lower panel portion depends below said upper panel portion and the belt;

a first strap forming a first loop for removably attaching a clip of a first communication device to said panel, said first loop being attached to the upper panel portion in a manner such that said first loop is positioned adjacent to and at substantially the same vertical level as the belt of the user when the belt is inserted through the said belt loop for thereby positioning the first communication device adjacent to the belt; and a second strap forming a second loop for removably attaching a clip of a second communication device to said panel, said second loop being attached to the lower panel portion of said panel in a manner such that said second loop is positioned longitudinally below said first loop for thereby positioning the second communication device below the first communication device and the belt of the use when said belt loop is mounted on the belt of a user and the first and second communication devices are mounted on said first and second loops.

8. The communication accessory device of claim 7, wherein each of said panel portions have a first surface and a second surface, a plane of each of said surfaces of said lower panel portion being inset from a respective plane of each of said surfaces of said upper panel portion.

9. The communication accessory device of claim 7, wherein said panel comprises a generally flexible material.

\* \* \* \* \*